(12) United States Patent
Ratkovic et al.

(10) Patent No.: US 6,573,486 B1
(45) Date of Patent: Jun. 3, 2003

(54) PROJECTILE GUIDANCE WITH ACCELEROMETERS AND A GPS RECEIVER

(75) Inventors: Joseph A. Ratkovic, Los Angeles, CA (US); Samuel N. Fersht, Studio City, CA (US); Robert D. Curby, Thousand Oaks, CA (US); Allan J. Brockstein, Chatsworth, CA (US); David Y. Hsu, Agoura Hills, CA (US)

(73) Assignee: Northrop Grumman Corporation, Woodland Hills, CA (US)

( * ) Notice: Subject to any disclaimer, the term of this patent is extended or adjusted under 35 U.S.C. 154(b) by 0 days.

(21) Appl. No.: 10/080,760

(22) Filed: Feb. 22, 2002

(51) Int. Cl.[7] .............................. F41G 7/00; F42B 15/01
(52) U.S. Cl. ...................... 244/3.2; 244/3.15; 701/207; 701/213; 701/214; 701/216; 342/357.01; 342/357.06
(58) Field of Search ................... 244/3.1, 3.15, 244/3.16–3.22; 701/200, 207, 213–216; 342/357.01–357.17, 61–65

(56) References Cited

U.S. PATENT DOCUMENTS

| | | | | |
|---|---|---|---|---|
| 5,260,709 A | * | 11/1993 | Nowakowski | 342/62 |
| 5,507,452 A | * | 4/1996 | Mayersak | 244/3.15 |
| 5,554,994 A | * | 9/1996 | Schneider | 342/357.06 |
| 5,657,947 A | * | 8/1997 | Mayersak | 244/3.19 |
| 6,003,809 A | * | 12/1999 | Honigsbaum | 244/3.15 |
| 6,037,899 A | * | 3/2000 | Weber | 342/357.06 |
| 6,157,875 A | * | 12/2000 | Hedman et al. | 244/3.15 |
| 6,163,021 A | * | 12/2000 | Mickelson | 244/3.2 |
| 6,237,496 B1 | * | 5/2001 | Abbott | 244/3.19 |
| 6,254,031 B1 | * | 7/2001 | Mayersak | 244/3.22 |
| 6,317,688 B1 | * | 11/2001 | Bruckner et al. | 701/213 |

OTHER PUBLICATIONS

Thomas Loffler et al., "A GPS/INS Missile Upgrade that Improves Effectiveness and Minimizes Friendly–Fire Accidents"; IEEE Publication No. 0–7803–7251–4/02/$10.00; Copyrighted in the year 2002.*

* cited by examiner

Primary Examiner—Bernarr E. Gregory

(57) ABSTRACT

A projectile guidance system without gyros in which the projectile has an orthogonal body coordinate system. The projectile has a triax of accelerometers providing x, y and z acceleration data measured along the x, y and z axes respectively. A GPS antenna and receiver means provides onboard GPS position and velocity data in earth referenced navigational coordinates. A computer and program means stores and accesses time indexed GPS position and GPS velocity data and transforms x, y and z axis acceleration data from body to navigation coordinates. The program means is responsive to corresponding time indexed acceleration data and to GPS velocity and position data for calculating and outputting an estimated projectile roll, pitch and yaw angle via optimal smoothing techniques with respect to local level for each time index iteration of present position to a flight control system for guiding the projectile to a predetermined location.

18 Claims, 9 Drawing Sheets

PROJECTILE GUIDANCE WITH ACCELEROMETERS AND A GPS RECEIVER

FIELD OF THE INVENTION

This invention relates to the field of aircraft or projectile attitude determination and estimation using a GPS receiver; the system using a first and second linear accelerometer for an estimation of the projectile's roll angle, and information from an additional third accelerometer for a pitch angle estimation.

BACKGROUND

The problem to be solved is how to guide a gun-fired projectile onto a target with a known geographic location at lowest cost. This application addresses a portion of that problem in providing an estimate of the trajectory of the projectile from launch, the initial conditions of the projectile immediately after launch and the distance, direction and altitude to the idealized trajectory calculated for the projectile at the time of launch or firing.

A first approach to the problem to be solved used only a GPS receiver and a turns counter. Such a system would be the least expensive approach but it would be vulnerable to GPS jamming. Additional funds would have to be expended on protecting the GPS signal.

A second approach used a GPS receiver, a turns counter, and a triax of gyros, which adds to the cost, and requires protection of the GPS signal almost all the way into the target. The protection is required because the gyros cannot account for any external forces which act on the projectile once the GPS signal is lost.

A third approach accounts for these external forces by adding accelerometers into the system such that the sensor package is flying a complete IMU. This package is expected is be too costly because of the gyros already in the package. Philosophically, one can either protect the GPS signal or operate with limited GPS data by requiring higher performance inertial instruments. The cost and robustness of providing GPS anti-jamming protection depends on the approach and the number, location and quality of the jammers. The GPS signal can be protected with anti-jamming electronics, and multi-beam antennae but at higher cost and complexity.

Gyroscopic instruments for aircraft use are well known and available in a number of technologies such as iron rotor and tuned rotor gyros, ring laser gyros, multi-oscillator gyros, zero lock gyros (ZLG), fiber optic gyros, resonator gyros such as HRGs or hemispherical or tubular ceramic resonant gyros and the like. Each of these systems have failure modes and uncertainties relating to a launch acceleration in the range of 15,000–30,000 Gs. Each of the technologies mentioned require that the vehicle carry at least one gyro in a gimbaled or strap-down arrangement with the attendant disadvantages of cost, weight and power dissipation.

SUMMARY

A first alternative embodiment of the invention system and process uses a GPS and a triax of accelerometers with no gyros. An algorithm uses GPS position and delta GPS delta velocity data along with data from the accelerometer triax to solve for the projectile's estimated attitude in pitch, roll and yaw. With the projectile's position known from data provided by the GPS receiver, the algorithm calculates the projectile's attitude in navigational coordinates and creates a time indexed record of the projectile's trajectory after the on-board GPS receiver locks on to the required number of satellites. The data in the time indexed record of the trajectory is filtered and smoothed.

As the projectile rolls, the accelerometers are used to measure the forces acting on the projectile and the projectile's rotation rates. The ultimate cost of this approach will depend on the required delivery accuracy which will drive the cost of the accelerometers that are to be used.

In some alternative embodiments of the invention, the GPS is used to provide data for the calculation of initial aiming and velocity errors and for the calibration of the accelerometers when positioned in the gun barrel prior to launch. Where cost must be reduced, much lower accuracy accelerometers can be used with a greater reliance on GPS signal data after launch.

DISCLOSURE OF THE INVENTION

Figure 1:
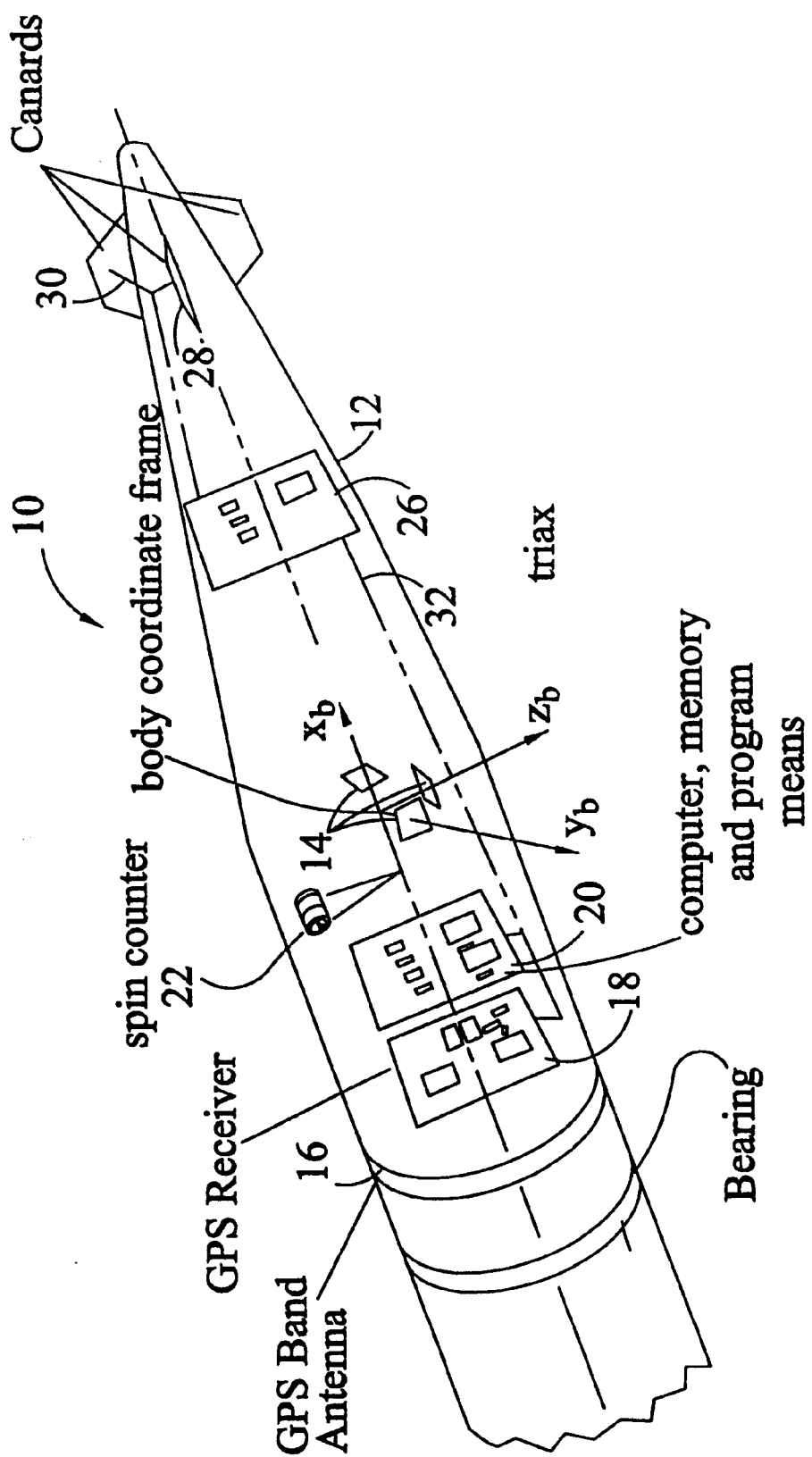
FIG. 1 is a perspective and exploded view of a projectile or unmanned airborne device equipped with an on-board GPS receiver, a set of accelerometers coupled to a vehicle frame and on-board computer cards for executing the invention process.

FIG. 1 schematically shows the major components in a preferred embodiment of a projectile guidance system without gyros 10 distributed in the exploded perspective view of a projectile 12. The projectile 12 is depicted in flight after having been fired from a gun (not shown).

Figure 4:
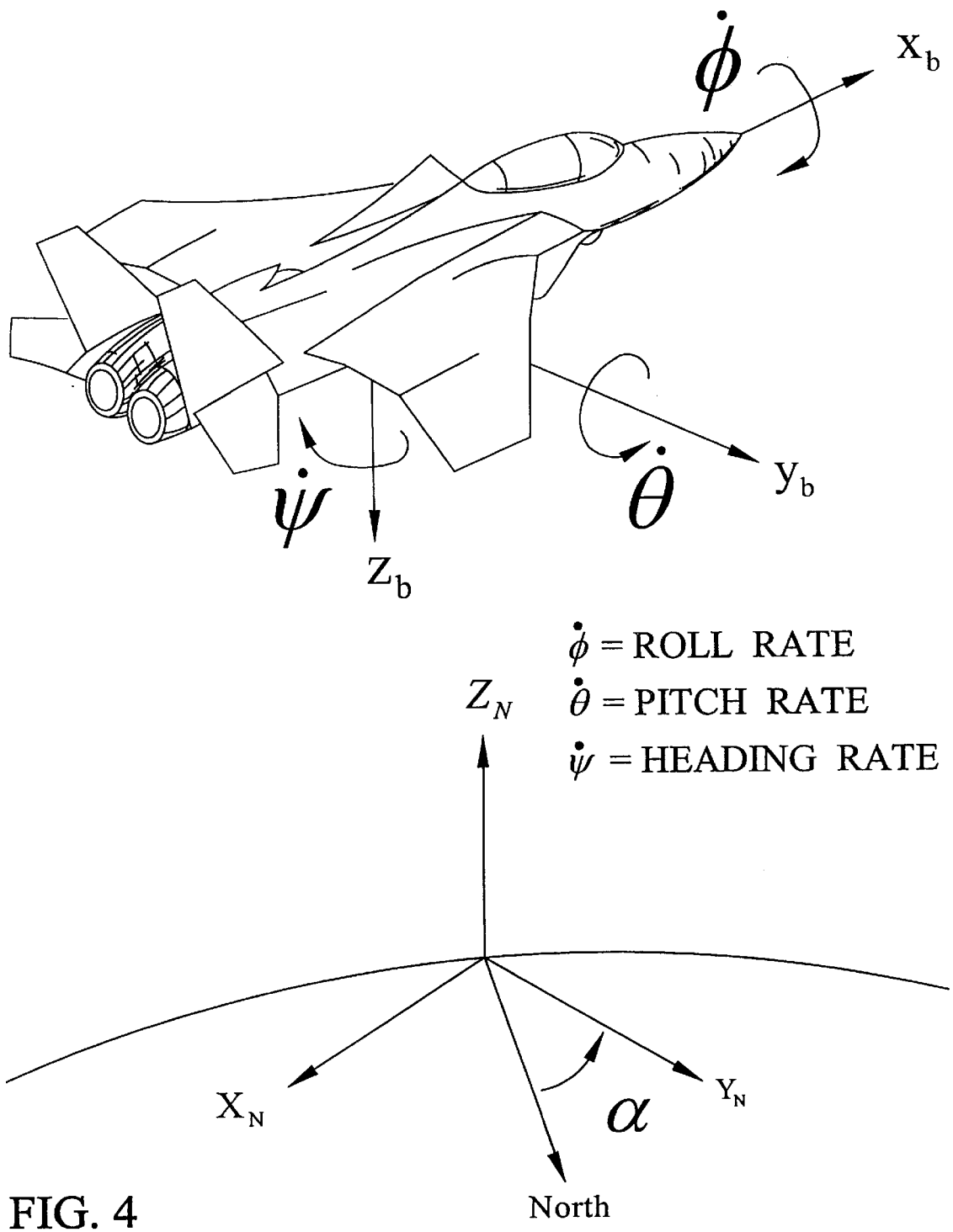
FIG. 4 is a perspective schematic view of an aircraft showing a typical coordinate system and defining angles of rotation.

The projectile is shown having an orthogonal body fixed coordinate system. The rotation rate components in roll $\phi$, with a longitudinal axis $x_b$, a pitch axis $y_b$, and a yaw axis $z_b$. FIG. 4 shows an aircraft with a corresponding orthogonal body coordinate system. The rotation rate components in roll $\dot\phi$, pitch $\dot\theta$ and yaw $\dot\psi$ are defined in FIG. 4. A locally level fixed earth navigational coordinate system is also depicted in FIG. 4. When the wander angle is zero, the $Y_N$ axis is typically parallel to a meridian of longitude and points true north. The $X_N$ axis is parallel to a parallel of latitude and points east and the $Z_N$ axis extends from the surface of the earth as a gravity vector. The angle $\alpha$ is used in a navigation system to traverse the poles of the earth without encountering position singularities. In operation, components of time indexed data elements such as projectile acceleration and velocity are transformed from the body coordinates, indicated by a subscript "b" into the earth referenced coordinate data elements indicated by a subscript N using conventional direction cosine matrices.

Referring again to FIG. 1, the projectile, guided by the projectile guidance system without gyros, has a triax of accelerometers 14. The triax has an x-axis accelerometer for providing x-axis acceleration data measured along the $x_b$ axis, a y-axis-accelerometer for providing y-axis acceleration data measured along the $y_b$ axis and a z-axis accelerometer for providing z-axis acceleration data measured along the $z_b$ axis. A GPS antenna represented by band 16 and a GPS receiver represented by module 18 in combination represent a means for providing onboard GPS position and altitude and GPS velocity data in earth referenced navigational coordinates. Module represents a guidance processor which provides the function of a computer, memory and program means for storing and accessing time indexed GPS position and GPS velocity data, and for transforming the x, y and z axis acceleration data from body to navigation coordinates. The acceleration data is arrayed and has time indexes that are common with the time indexes for the GPS position and velocity data. A turns counter 22 provides an ac signal in flight representing the angular rate of rotation of the projectile in the earth's magnetic field.

The computer, memory and program means on module 20 receives and responds to corresponding time indexed acceleration data, GPS velocity and position data for calculating and outputting corresponding sets of time indexed estimates of the projectile roll, pitch and yaw angles with respect to the locally level earth referenced navigation coordinates for each time index iteration of the program to provide present position, velocity and acceleration data to a flight control and ballistic data system represented by module 26 for it to use in guiding the projectile to a predetermined target location.

The flight control and ballistic data system controls the projectile by providing commands to control surfaces such as canards 28, 30 to keep the projectile on a trajectory to the target location. The selection and or design of a flight control and ballistic data system represented by card or module 26 is believed to be a design choice and is not the subject of this invention disclosure. The flight control and ballistic data system 26 is pre-programmed to use information provided via bus 32 from the projectile guidance system without gyros 12, after launch, to de-spin the projectile and to roughly position the top of the projectile skyward so as to optimize the reception of GPS signals. After the projectile is de-spun, the accelerometers are un-caged and activated. The computer, memory and program means then performs its first estimate and update of the state matrix including an estimate of the vehicle rates.

If the vehicle is rolling, then rate information is extracted by separating the accelerometer ac signal from the dc or steady state signal. As the projectile rolls, the pitch and yaw accelerometers output signals will vary as a sine wave function. If the vehicle is not rolling, then data is extracted and transferred from the body coordinate system to the earth referenced navigation coordinate system using DCM (direction cosine matrix) relationships as required.

Figure 2:
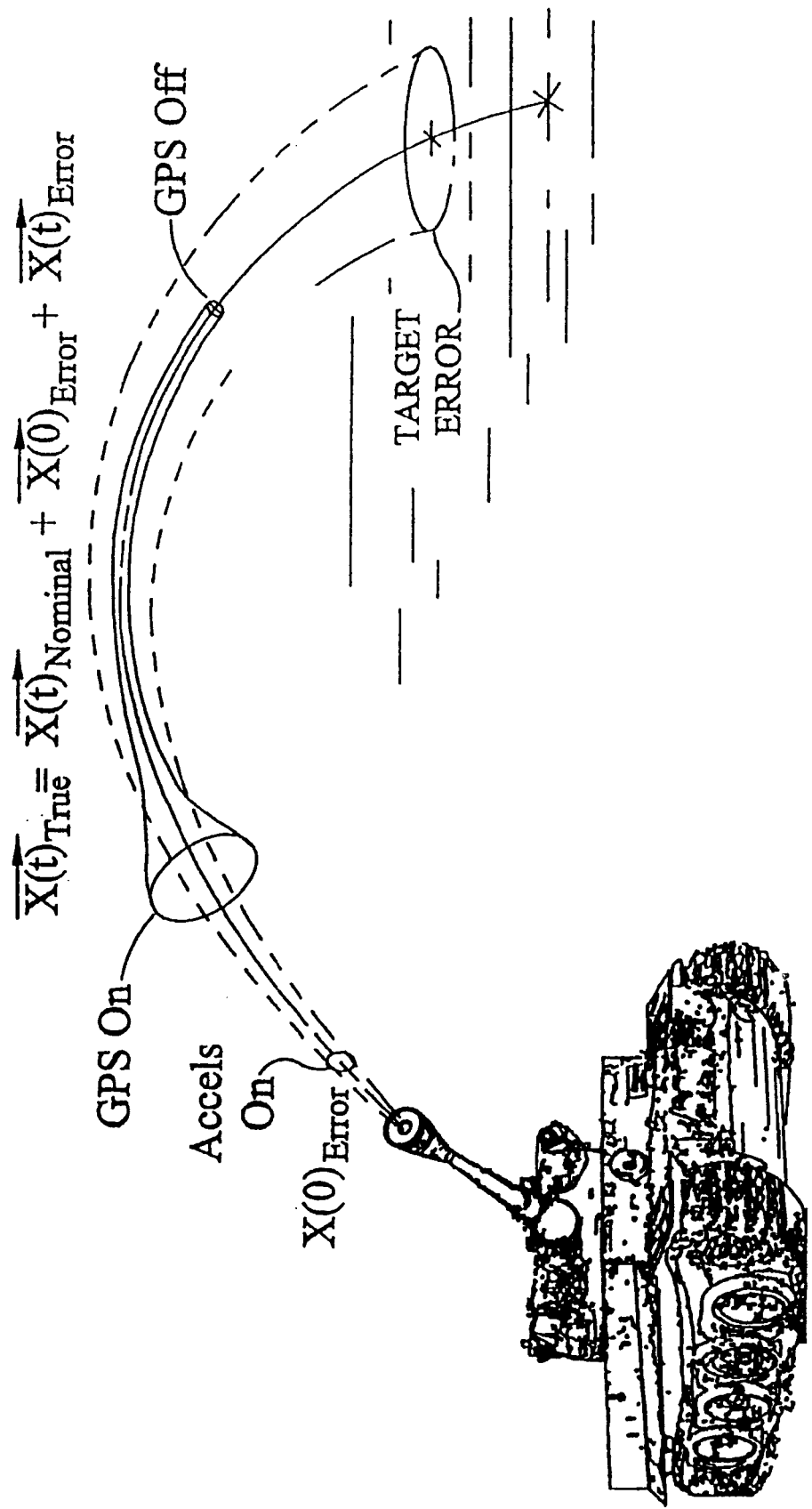
FIG. 2 shows a launch vehicle and a desired trajectory with a flight error envelope region around the trajectory.

FIG. 2 shows a mobile artillery weapon, firing a projectile toward a target. In the equation shown, $\vec{X(t)}_{True}$ is a vector quantity representing the computed true position of the projectile as a function of time. $\vec{X(t)}_{Nominal}$ is a vector representing the ideal location of the projectile on the ideal trajectory. $\vec{X(0)}_{Error}$ is a vector representing the position error of the projectile at time zero before launch. $\vec{X(t)}_{Error}$ is a vector representing the error in the projectiles position due to accumulated errors resulting from navigational instrument error and GPS errors. The figure shows the sequence of events and schematically portrays an error budget region in dashed lines that concludes with an ellipse representing the TARGET ERROR that can result from launching the projectile using conventional artillery practice with no on board guidance. The funnel region in a continuous line schematically shows the position error of an on-board GPS progressively diminishing and asymptotically approaching a limit that is much smaller than the TARGET ERROR limit for a trajectory with no on board guidance. The invention projectile guidance system without gyros 10 uses a triad of accelerometers to provide real time body referenced data to a computer, memory and program means and real time position data from a GPS to establish and output the attitude of the projectile. The outputs are Kalman filtered and coupled to the flight control and ballistic data system represented by module 26 shown in FIG. 1 along with the aiding GPS position data for use in steering the projectile into the region bounded by the funnel region.

Figure 3A:
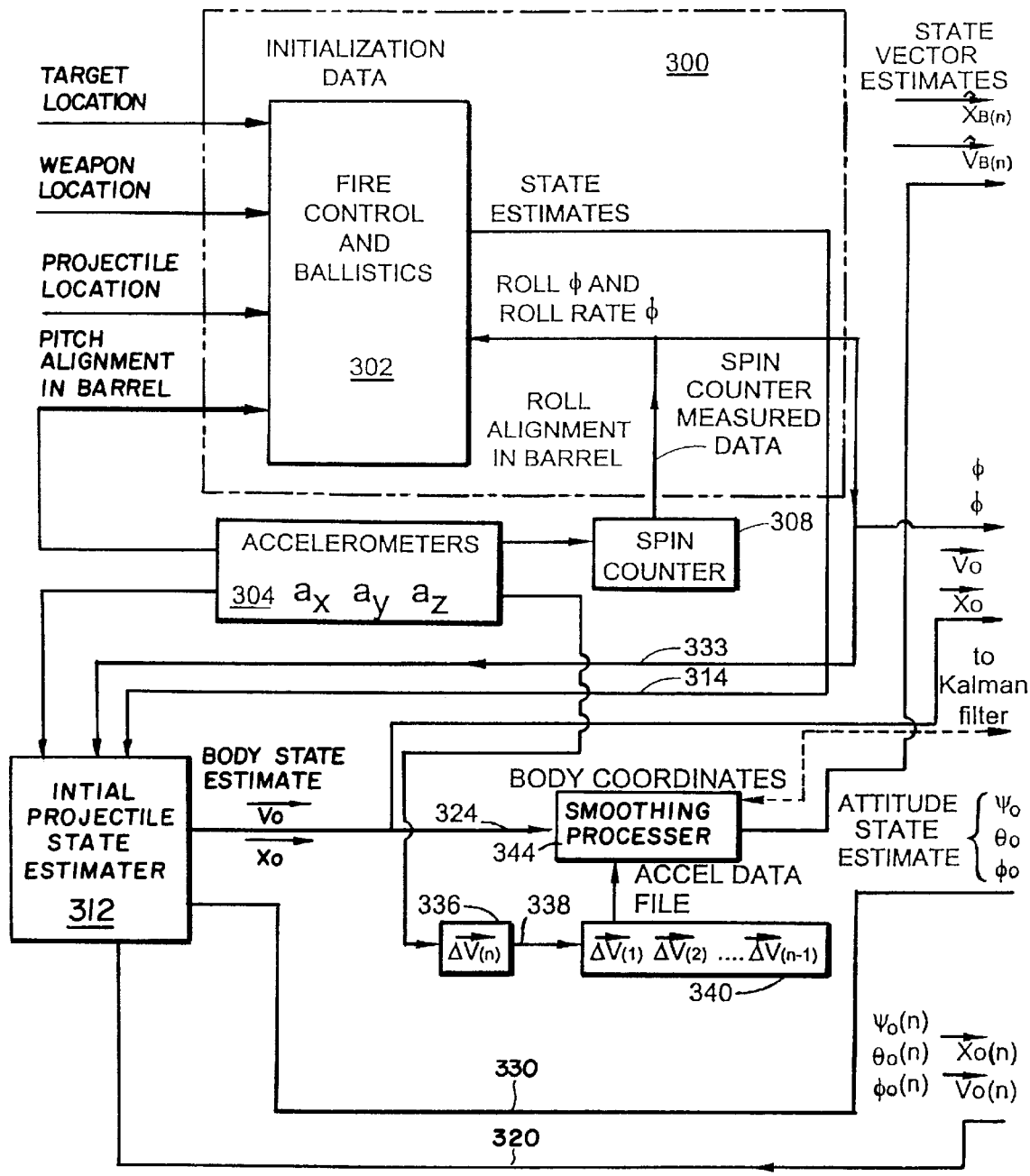
FIGS. 3a and 3b show a block diagram for processing accelerometer and GPS data for the purpose of estimating the trajectory of flight.
Figure 3B:
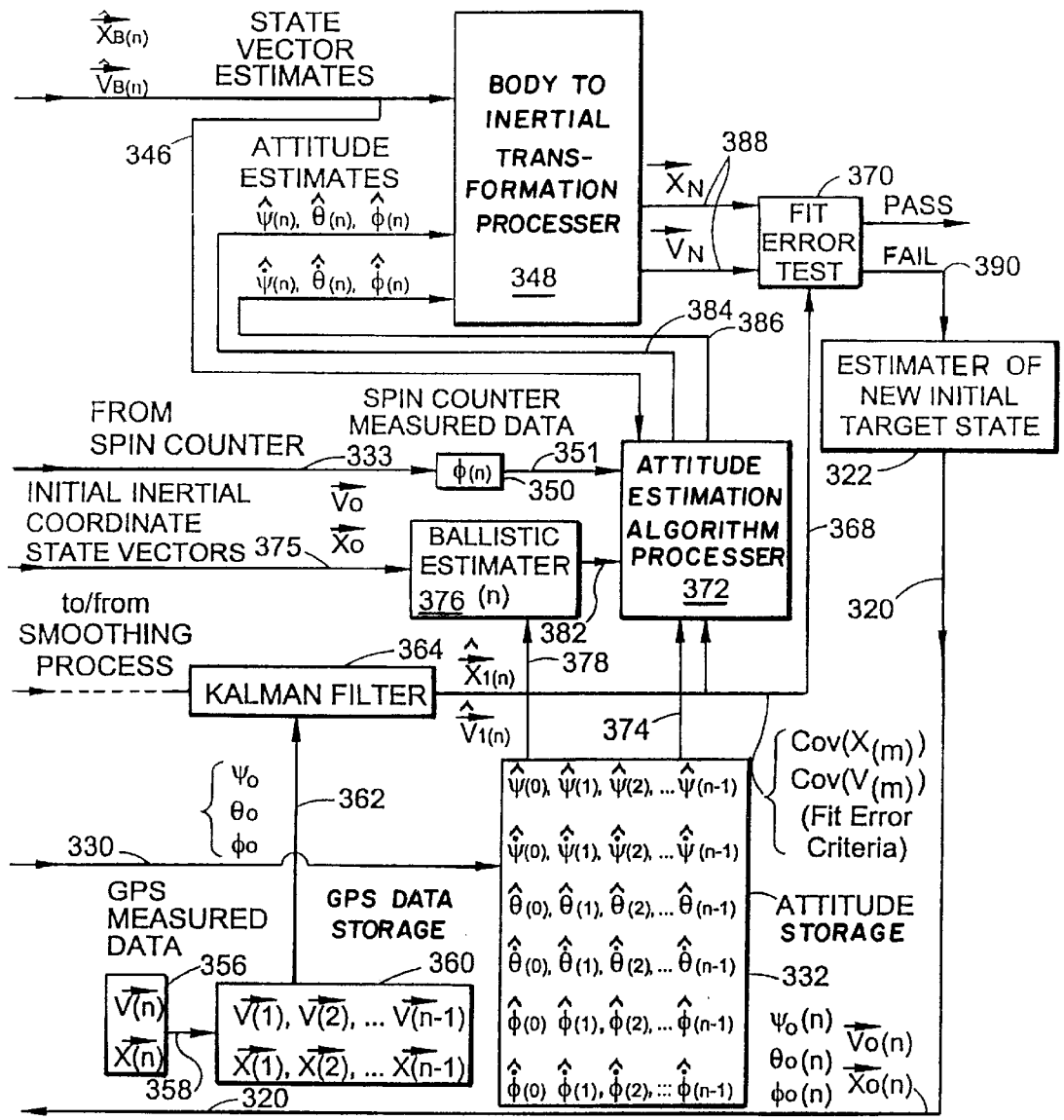

FIGS. 3a and 3b schematically show an embodiment of a data flow used by the projectile guidance system without gyros 10. Phantom block 300 represents the function provided by a fire control and ballistics computer as it executes an initialization program to process data received from data sources such as an external input of a TARGET LOCATION, the geographic location of the weapon launching the projectile, the PROJECTILE TYPE, the PITCH ALIGNMENT IN BARREL, the pitch angle of the launching tube, the outputs of the triax 304 of three components of acceleration $a_x$, $a_y$ and $a_z$ in body coordinates, the roll angle ROLL $\phi$, and the roll rate ROLL RATE $\dot{\phi}$ from the spin counter 308. The FIRE CONTROL AND BALLISTICS computer processes the data available and prior to launch transfers the initial state data such as the initial orientation angles, body fixed angle rates, present position and initial velocity components. The spin counter 308 and the triax 304 provide their outputs directly to the INITIAL PROJECTILE STATE ESTIMATE 312 via signal paths 314 and 333 respectively. It is most likely that all initial conditions would be input into the projectile from and external source such as the FIRE CONTROL AND BALLISTICS function 302 via an electrical, magnetic or optical link, or perhaps mechanical link. If the gun were to be mounted on a ship, the initial conditions would have to be extended to include data such as the ship's velocity, heading, displacement from the ship's inertial guidance computer, and possibly the coordinates of the gun with respect to the station from which the gun is receiving its initial condition information.

The FIRE CONTROL AND BALLISTICS function 302 also provides roll indexing information to the spin counter 308 to provide a zero reference. The spin counter 308 provides estimates of roll angle $\phi_b$ to an accuracy of a few degrees, as well as roll rate $\dot{\phi}_b$. The FIRE CONTROL AND BALLISTICS function 302 pre-computes an expected ballistic trajectory which is also passed to the projectile. This ballistic information, along with accelerometer information, or data directly from the FIRE CONTROL AND BALLISTICS function 302 is used to determine the initial state vector and attitudes of the projectile at initialization of the estimation process. The algorithm is initialized when both the accelerometer and the GPS data are available for state estimation. The FIRE CONTROL AND BALLISTICS function 302 also receives a set of initial states for orientation and position of the projectile via signal path 320 from the ESTIMATION OF NEW INITIAL TARGET STATE function 322 as a result of a failure of a fit test.

The FIRE CONTROL AND BALLISTICS function 302 outputs a set of initial STATE ESTIMATES to the INITIAL PROJECTILE STATE ESTIMATE functional block 312 which transfers initial BODY STATE ESTIMATES $\vec{V}_0^-$, $\vec{X}_0^-$ via signal path 324 to SMOOTHING PROCESS function block 344 and a set of ATTITUDE STATE ESTIMATES via signal path 330 to the initial state estimate of the initial attitude angle array in ATTITUDE FILE 332.

The turns or SPIN COUNTER 308 which provided turn count data to the FIRE CONTROL AND BALLISTICS function 302 also provides turn count data via signal line 333 to the INITIAL PROJECTILE STATE ESTIMATE FUNCTION block 312 and to the time indexed SPIN COUNTER MEASURED DATA memory array represented on FIG. 3b by functional block 350 where the total roll angle $\phi_{(n)}$ of the projectile is accumulated and time indexed and transferred via path 351 to the ATTITUDE ESTIMATION ALGORITHM 372. Spin counter technology is a mature technology. The Alliant Techsystems company has reportedly developed one small enough to fit into a 20 mm projectile. A turns counter for larger diameter projectiles is therefore a product that can be purchased for use in the invention system and process without difficulty. The output of the turns counter is a sine wave output as the projectile rotates through the Earth's Magnetic Field.

The INITIAL PROJECTILE STATE ESTIMATE FUNCTION block 312 provides initial ATTITUDE STATE ESTIMATE values for azimuth $\psi_0$, pitch $\theta_0$ and roll $\phi_0$ angle to the ATTITUDE FILE 332 in FIG. 3b as initial values.

The outputs of the triax 304 of three components of acceleration $a_x$, $a_y$ and $a_z$ in body coordinates are processed by the function represented by the block 336 to transfer time indexed body referenced changes in velocity via signal path 338 to the ACCEL DATA FILE memory array 340. The ACCEL DATA FILE memory array 340 couples an array of time indexed acceleration data elements to the SMOOTHING PROCESS function block 344.

The filtering and smoothing process of block 344 will be discussed in connection with FIGS. 6, 7a and 7b later in this disclosure. The smoothing process uses the initial estimates of attitude, velocity and position in conjunction with the present accelerometer data to determine velocity and position of the projectile in body coordinates. The output of the smoothing process are STATE VECTOR ESTIMATES, $\vec{X}_{B(n)}$, $\vec{V}_{B(n)}$ for position and velocity which are coupled via signal path 346 to the BODY TO INERTIAL TRANSFORMATION functional block 348.

The GPS MEASURED DATA function block 356 periodically receives time indexed velocity and position data $\vec{V}_{(n)}$ and $\vec{X}_{(n)}$ and transfers the data via signal path 358 into the time indexed array in the computer, memory and program means memory shown as function block 360. The GPS velocity and position data is transferred via signal path 362 to a Kalman filter represented by function block 364. The Kalman filter transfers filtered values of the projectile's estimated present position and velocity vectors via signal path 368 to the FIT ERROR TEST functional block 370 and to the ATTITUDE ESTIMATION ALGORITHM functional block 372. The ATTITUDE FILE 332 transfers time indexed estimated attitude angles and attitude angular rate data to the ATTITUDE ESTIMATION ALGORITHM functional block 372 via signal path 374 and to the BALLISTICS ESTIMATE (n) functional block 376 via transfer path 378 in earth referenced navigational coordinates. The BALLISTIC ESTIMATES uses the known model characteristics of the projectile with the corrected initial position and initial velocity information via path 375 and the history of all past attitude and attitude rates from path 378 to provide a modeled estimate of the present position and velocity via path 382 to the ATTITUDE ESTIMATION ALGORITHM 372.

The filtered body STATE VECTOR ESTIMATES $\vec{X}_{B(n)}$, $\vec{V}_{B(n)}$, vectors in the orthogonal body coordinate system, are transferred via signal path 346 to the BODY TO INERTIAL TRANSFORMATION block 348. The BODY TO INERTIAL TRANSFORMATION block 348 receives the estimated attitude angles and attitude angular via signal paths 384 and 386 and processes the STATE VECTOR ESTIMATES from representation in the orthogonal body coordinate system into vectors in the earth referenced navigational coordinate system to position and velocity estimates in earth referenced navigational coordinates using conventional direction cosine transformations such as those explained in the text by George Siouris, titled "Aerospace Avionics Systems, A Modern Synthesis", published by Academic Press, published in 1993. This estimation process can be simplified and improved using measured turns counter data and by computing a new ballistic trajectory based on new initial state information.

The BODY TO INERTIAL TRANSFORMATION functional block 348 outputs the estimated position and velocity STATE VECTOR ESTIMATES in earth referenced navigational coordinates via signal path 388 to the FIT ERROR TEST functional block 370 where the STATE VECTOR ESTIMATES are compared to the Kalman filtered GPS position and velocity. It is not possible in a statistical sense to make the estimation process fit better than the GPS position and the errors associated with the GPS. If the error for the differences between the two state vectors is less than 1 or 2 times the GPS error, the algorithm declares the fit to be "statistically good enough" to quit and wait for a new measured data point to arrive. If the test passes, the estimates of position, velocity, attitude and attitude rates are used to update the n–1 position in the estimated position and attitude time indexed memory arrays.

If the test fails, the algorithm estimates a new set of initial projectile states via a perturbation algorithm and repeats the estimation process again, until the solution converges to limits within the predetermined fit error criteria. If the test fails, a FAIL signal is coupled via path 390 to the ESTIMATION OF NEW INITIAL TARTET STATE functional block 322 which adjusts the initial position, velocity, attitude and attitude rates and couples a modified set of estimated state data via signal path 320 into the INITIAL PROJECTILE STATE ESTIMATE functional block 312 for an additional cycle. Iteration continues until the initial conditions are adjusted to obtain a PASS signal out of functional block 370 followed by the next data iteration using GPS data one second later.

As discussed previously, in order to avoid heavy reliance on GPS and protection of the GPS signal, it is recommended that higher performing inertial instruments be utilized. For this application the accelerometer should perform at better than 100 micro g level. Honeywell's VBA accelerometers and Silicon Accelerometer supplied from the Litton Guidance & Control Systems Div. of Northrop Grumman Inc. at Woodland Hills, Calif. 91637, the assignee, have such a capability.

A GPS Receiver by Alliant Techsystems is available for use in the invention system and process. The Alliant GPS uses a type 509 processor that has sufficient processing power and a separate memory which can be used to store user software and the system processor for this application. The Alliant receiver is configured with multiple RF front ends to accommodate multiple antenna inputs as a means of protecting the GPS signal as the projectile rolls. The GPS 509 processor can also be used to process the data and integrate the inertial data with the GPS and turns counter data. Software can be incorporated into the 509 processor to extract rate information from the accelerometer triax and integrate the data from the sensors.

The roll angle of a guided projectile is typically provided by a gyro or a gyro platform. A roll angle signal characterizing the roll angle of the projectile is necessary to enable a flight control system to drive the flight control surfaces, such as canards, to roll the projectile to the left or right as required, to use lift from its lift surfaces to change the heading of the projectile to one directed to a target. It is an objective of this disclosure to provide a mathematical and therefore, a computer programmable process, for generating the roll angle of the projectile without signals from a gyro and by using the accelerometer outputs of a triax and the position and velocity signals from a GPS.

This technical description uses the following notation. $\vec{x}$ denotes a vector with no specific reference frame of resolution. $\vec{x}^b$ denotes a vector resolved in a coordinate frame called the body-frame or projectile-frame. All coordinate frames discussed herein, including the body-frame coordinates, are right-handed orthogonal frames that have x, y, and z axes that extend from a location in the body of the projectile, such as the center of gravity, or origin designated as a reference point "O" to form an orthogonal triad extending in the forward or positive "$x_b$" axis direction, in the right or positive "$y_b$" axis direction and down in the positive "$z_b$" axis directions. At least two accelerometers are fixed to and aligned with the body-frame along the $y_b$ and $z_b$ axes. The principal axes of the b-frame coincide with the input axes of the inertial sensors and intersect at the origin "O". A second coordinate frame of interest is the geographic or earth referenced navigational coordinate system or frame with principal axes X, Y and Z that coincide with the East, North, and Up directions as shown at the bottom of FIG. 4.

Subscripts on vectors are used to indicate a particular property or identification of the vector. Matrices are designated with capital letters. $C_N^b$ denotes a direction cosine matrix (DCM) that transforms a vector from the N-frame or call Navigation-frame to the body-frame, i.e., $\vec{x}^b = C_N^b \vec{X}^N$. Time dependency of a quantity is indicated with round brackets around a time variable or index. For example, $C_N^b(t_1)$ denotes the value of the DCM for the conversion from navigational to body-frame coordinates at time $t_1$. The transpose of the $C_N^b(t_1)$ DCM provides $C_b^N(t_1)$ the DCM for the conversion from body-frame to navigational-frame coordinates at time $t_1$.

An increment of a variable is indicated with the symbol Δ. For example, $\Delta\vec{x}$ denotes the increment of the vector $\vec{x}$ over a predefined time interval. An error in a variable is indicated with the symbol δ. For example, $\delta\vec{x}$ denotes the error in the vector $\vec{x}$. The symbol $\dot{=}$ indicates an approximate or substantially close equality.

Sensors and Orientation

In a two accelerometer arrangement, a first accelerometer is positioned to sense acceleration along the $y_b$ body axis that extends outward from the right side of the body. A second accelerometer is positioned to sense acceleration along the $z_b$ body axis that extends downward from the origin forming the yaw axis. A third accelerometer, not required for the computation of a roll variable, is positioned to sense acceleration along the $x_b$ or forward axis.

Roll Angle Computation

The accelerometer outputs are resolved from body coordinates into navigational coordinate values in accordance with the following equation:

$$A^N = C_b^N A^b \dot{=} \{T\}\{H\}^T\{P\}^T\{R\}^T A^b \qquad \text{1a.}$$

where $A^b$ represents the acceleration vector in body coordinates, the bracketed H, P and R operators $\{H\}^T$, $\{P\}^T$, $\{R\}^T$ individually represent the transpose of the positive rotation DCM transformation steps from body to navigational coordinates for the heading or yaw, about $z_b$, pitch, about $y_b$ and roll, about $x_b$, of the vehicle or projectile fixed coordinate system, in that sequence, to obtain the acceleration vector $A^N$ as elements of vehicle acceleration in navigation coordinates with components along the fixed navigation or earth referenced East, X, North, Y and Up, Z axis.

DCM {T} represents a unitary matrix that transforms the body referenced acceleration data from a North, East, Down system into an East, North, Up frame and is defined as:

$$\text{1b.} \quad \{T\} \triangleq \begin{vmatrix} 0 & 1 & 0 \\ 1 & 0 & 0 \\ 0 & 0 & -1 \end{vmatrix}$$

The data elements of acceleration $A_b$, from the triad of accelerometers on the projectile, are integrated over a predetermined incremental time interval such as one second to obtain incremental changes in velocity in navigational coordinates in accordance with the following equation:

$$\Delta V^N = \int C_b^N A^b dt \dot{=} \{T\}\{H\}^T\{P\}^T\{R\}^T A^b \Delta T \qquad 2.$$

Concurrent with each calculation of the incremental change in velocity based on accelerometer data, GPS data is used to calculate an incremental change in velocity. The GPS data is already in navigational coordinates. The following equation is used:

$$\Delta V_{GPS} \dot{=} V_{GPS2} - V_{GPS1} \dot{=} \Delta V^N \dot{=} \{T\}\{H\}^T\{P\}^T\{R\}^T A^b \Delta T \qquad 3.$$

A double integration is performed on the body accelerometer data along with a body to navigation frame transformation to obtain the change in position based on transformed accelerometer data from the body frame using the following equation:

$$\Delta P^N = \iint C_b^N A^b dt d\tau \dot{=} \{T\}\{H\}^T\{P\}^T\{R\}^T A^b \Delta T^2 \qquad 4.$$

With each calculation of the incremental change in position based on accelerometer data, $\Delta P^N$, GPS data is used to calculate a substantially equal GPS incremental change in position, $\Delta P_{GPS}$. The following equation is used:

$$\Delta P_{GPS} \dot{=} P_{GPS2} - P_{GPS1} \dot{=} \Delta P^N \dot{=} \{T\}\{H\}^T\{P\}^T\{R\}^T A^b \Delta T^2 \qquad 5.$$

Group Equations

The product of a DCM matrix and its transpose is equal to the identity matrix. Therefore $$\{P\}^T\{P\} = \{I\} \qquad \text{6a.}$$

$$\{H\}^T\{H\} = \{I\} \qquad \text{6b.}$$

From equation 3, it is possible to relate change in velocity components or accelerations components from the GPS data to acceleration components from accelerometer data as follows:

$\Delta V_{GPS} \doteq \{T\}\{H\}^T\{P\}^T\{R\}^T A^b \Delta T = \Delta V^N$     7a.

From equation 5, it is possible to relate change in position components or velocity components from the GPS data to velocity components from accelerometer data as follows:

$\Delta P_{GPS} \doteq \{T\}\{H\}^T\{P\}^T\{R\}^T A^b \Delta T^2 \doteq \Delta P^N$     7b.

If the pitch, heading and unitary transformation DCMs are grouped or multiplied to form a single DCM, $\{Q\}$, and the increment in time is chosen for simplicity to be 1 second (however, it should be understood that any time increment can be used in the equations):

$\{Q\} \doteq \{P\}\{H\}\{T\}$     8a.

$\Delta T = 1$ Second and $\Delta T^2 = 1$ Second squared = 1     8b.

Substituting 1 for $\Delta T$ in equation 7a and 1 for $\Delta T^2$ in equation 7b and multiplying both sides of equations 7a and 7b by the transpose of the unitary, heading and pitch DCMs, in that order, provides the following equations:

9a.   $\{P\}\{H\}\{T\}(\Delta V_{GPS}) \doteq \{R\}A^b \doteq \{Q\}(\Delta V_{GPS})$ 9b.   $\{P\}\{H\}\{T\}(\Delta P_{GPS}) \doteq \{R\}A^b \doteq \{Q\}(\Delta P_{GPS})$ Using CP to represent Cos θ, SP to represent Sin θ, CH to represent Cos ψ, SH to represent Sin ψ, CR to represent Cos φ and SR to represent Sin φ, then the six DCMs for the rotation conversions from body to navigation coordinates are:

10a   $\{P\} \triangleq \begin{vmatrix} CP & 0 & -SP \\ 0 & 1 & 0 \\ SP & 0 & CP \end{vmatrix}$    $\{P\}^T \triangleq \begin{vmatrix} CP & 0 & SP \\ 0 & 1 & 0 \\ -SP & 0 & CP \end{vmatrix}$ 10b.   $\{H\} \triangleq \begin{vmatrix} CH & SH & 0 \\ -SH & CH & 0 \\ 0 & 0 & 1 \end{vmatrix}$    $\{H\}^T \triangleq \begin{vmatrix} CH & -SH & 0 \\ SH & CH & 0 \\ 0 & 0 & 1 \end{vmatrix}$ and 10c.   $\{R\} \triangleq \begin{vmatrix} 1 & 0 & 0 \\ 0 & CR & SR \\ 0 & -SR & CR \end{vmatrix}$    $\{R\}^T \triangleq \begin{vmatrix} 1 & 0 & 0 \\ 0 & CR & -SR \\ 0 & SR & CR \end{vmatrix}$ Where the body is a projectile fired from a gun, the pitch angle is the angle of the barrel at firing and the heading is the angle ψ that the barrel makes with true north at firing. Both are available from initialization from the system and are expected to be close to the normal trajectory with time, and therefore nominally known.

The elements of $\{Q\}$ are known from 8a, 10a, and 10b and are believed to be slowly varying, so let $\{Q\}$ be:

11.   $\{Q\} = \begin{vmatrix} q_{11} & q_{12} & q_{13} \\ q_{21} & q_{22} & q_{23} \\ q_{31} & q_{32} & q_{33} \end{vmatrix}$ Rewriting equations 9a and 9b and substituting $\{Q\}$ into the result for $\{P\}\{H\}\{T\}$ with $\Delta T = 1$ second and $\Delta T^2 = 1$ second provides, 12a.   $\{Q\}(\Delta V_{GPS}) \doteq \{R\}A^b$ -continued 12b.   $\{Q\}(\Delta P_{GPS}) \doteq \{R\}A^b$ Reversing the left and right sides:

13a.   $\{R\}A^b \doteq \{Q\}(\Delta V_{GPS})$

13b.   $\{R\}A^b \doteq \{Q\}(\Delta P_{GPS})$

Since the roll DCM is characterized in 10c and accelerometer data is a vector:

10d.   $\{R\} = \begin{vmatrix} 1 & 0 & 0 \\ 0 & CR & SR \\ 0 & -SR & CR \end{vmatrix}$ $A^b = a_1 \hat{x}_b + a_2 \hat{y}_b + a_3 \hat{z}_b$     14.

where $\hat{x}_b$, $\hat{y}_b$, and $\hat{z}_b$ are unit vectors along the body axis.

Equations 13a and 13b are rewritten as:

15a.   $\begin{vmatrix} 1 & 0 & 0 \\ 0 & CR & SR \\ 0 & -SR & CR \end{vmatrix} \begin{vmatrix} a_1 \\ a_2 \\ a_3 \end{vmatrix} \doteq \left\{ \begin{vmatrix} q_{11} & q_{12} & q_{13} \\ q_{21} & q_{22} & q_{23} \\ q_{31} & q_{32} & q_{33} \end{vmatrix} \right\} (\overline{\Delta V}_{GPS})$ 15b.   $\begin{vmatrix} 1 & 0 & 0 \\ 0 & CR & SR \\ 0 & -SR & CR \end{vmatrix} \begin{vmatrix} a_1 \\ a_2 \\ a_3 \end{vmatrix} \doteq \left\{ \begin{vmatrix} q_{11} & q_{12} & q_{13} \\ q_{21} & q_{22} & q_{23} \\ q_{31} & q_{32} & q_{33} \end{vmatrix} \right\} (\overline{\Delta P}_{GPS})$ The incremental accelerometer and velocity data from the GPS is made available in fixed navigation coordinates forming two three-element vectors $\overline{\Delta V}_{GPS} = \Delta V_x \hat{x} + \Delta V_y \hat{y} + \Delta V_z \hat{z}$ and     16a.

$\overline{\Delta P}_{GPS} = \Delta P_x \hat{x} + \Delta P_y \hat{y} + \Delta P_z \hat{z}$     16b.

where $\hat{x}$, $\hat{y}$ and $\hat{z}$ are basic unit vectors of the East, North and Up coordinate frame system.

The matrix for $\{Q\}$ in 15a and 15b are multiplied by the vectors of 16a and 16b as:

17a   $\begin{vmatrix} 1 & 0 & 0 \\ 0 & CR & SR \\ 0 & -SR & CR \end{vmatrix} \begin{vmatrix} a_1 \\ a_2 \\ a_3 \end{vmatrix} \doteq \left\{ \begin{vmatrix} q_{11} & q_{12} & q_{13} \\ q_{21} & q_{22} & q_{23} \\ q_{31} & q_{32} & q_{33} \end{vmatrix} \right\} \begin{pmatrix} \Delta V_x \\ \Delta V_y \\ \Delta V_z \end{pmatrix}$ 17b.   $\begin{vmatrix} 1 & 0 & 0 \\ 0 & CR & SR \\ 0 & -SR & CR \end{vmatrix} \begin{vmatrix} a_1 \\ a_2 \\ a_3 \end{vmatrix} \doteq \left\{ \begin{vmatrix} q_{11} & q_{12} & q_{13} \\ q_{21} & q_{22} & q_{23} \\ q_{31} & q_{32} & q_{33} \end{vmatrix} \right\} \begin{pmatrix} \Delta P_x \\ \Delta P_y \\ \Delta P_z \end{pmatrix}$ The left sides of 17a and 17b are multiplied out forming a 3×1 matrix on the left:

18a.   $\begin{bmatrix} a_1 \\ a_2 CR + a_3 SR \\ -a_2 SR + a_3 CR \end{bmatrix} \doteq \left\{ \begin{vmatrix} q_{11} & q_{12} & q_{13} \\ q_{21} & q_{22} & q_{23} \\ q_{31} & q_{32} & q_{33} \end{vmatrix} \right\} \begin{pmatrix} \Delta V_x \\ \Delta V_y \\ \Delta V_z \end{pmatrix}$ 18b.   $\begin{bmatrix} a_1 \\ a_2 CR + a_3 SR \\ -a_2 SR + a_3 CR \end{bmatrix} \doteq \left\{ \begin{vmatrix} q_{11} & q_{12} & q_{13} \\ q_{21} & q_{22} & q_{23} \\ q_{31} & q_{32} & q_{33} \end{vmatrix} \right\} \begin{pmatrix} \Delta P_x \\ \Delta P_y \\ \Delta P_z \end{pmatrix}$ The first element $a_1$ of the vector on the left hand side of equations 18a and 18b, i.e., has no roll angle component because it represents acceleration down the vehicle's longitudinal axis, therefore it is deleted leaving only the second and third row expressions. From Equations 18a and 18b:

$$19a. \begin{bmatrix} a_2 CR + a_3 SR \\ -a_2 SR + a_3 CR \end{bmatrix} \doteq \begin{bmatrix} q_{21} & q_{22} & q_{23} \\ q_{31} & q_{32} & q_{33} \end{bmatrix} \begin{Bmatrix} \Delta Vx \\ \Delta Vy \\ \Delta Vz \end{Bmatrix}$$

$$19b. \begin{bmatrix} a_2 CR + a_3 SR \\ -a_2 SR + a_3 CR \end{bmatrix} \doteq \begin{bmatrix} q_{21} & q_{22} & q_{23} \\ q_{31} & q_{32} & q_{33} \end{bmatrix} \begin{Bmatrix} \Delta Px \\ \Delta Py \\ \Delta Pz \end{Bmatrix}$$

The left side of 19a and 19b can be rewritten to form a 2×2 matrix times a 2×1 matrix as:

$$20a. \begin{bmatrix} a_2 CR + a_3 SR \\ -a_2 SR + a_3 CR \end{bmatrix} = \begin{bmatrix} a_2 & a_3 \\ a_3 & -a_2 \end{bmatrix} \begin{bmatrix} CR \\ SR \end{bmatrix} \doteq \begin{bmatrix} q_{21} & q_{22} & q_{23} \\ q_{31} & q_{32} & q_{33} \end{bmatrix} \begin{Bmatrix} \Delta Vx \\ \Delta Vy \\ \Delta Vz \end{Bmatrix}$$

$$20b. \begin{bmatrix} a_2 CR + a_3 SR \\ -a_2 SR + a_3 CR \end{bmatrix} = \begin{bmatrix} a_2 & a_3 \\ a_3 & -a_2 \end{bmatrix} \begin{bmatrix} CR \\ SR \end{bmatrix} \doteq \begin{bmatrix} q_{21} & q_{22} & q_{23} \\ q_{31} & q_{32} & q_{33} \end{bmatrix} \begin{Bmatrix} \Delta Px \\ \Delta Py \\ \Delta Pz \end{Bmatrix}$$

Combining 20a and 20b obtains:

$$20c. \begin{bmatrix} a_2 & a_3 \\ a_3 & -a_2 \\ a_2 & a_3 \\ a_3 & -a_2 \end{bmatrix} \begin{bmatrix} CR \\ SR \end{bmatrix} \doteq \begin{bmatrix} q_{21} & q_{22} & q_{23} & 0 & 0 & 0 \\ q_{31} & q_{32} & q_{33} & 0 & 0 & 0 \\ 0 & 0 & 0 & q_{21} & q_{22} & q_{23} \\ 0 & 0 & 0 & q_{31} & q_{32} & q_{33} \end{bmatrix} \begin{bmatrix} \Delta Vx \\ \Delta Vy \\ \Delta Vz \\ \Delta Px \\ \Delta Py \\ \Delta Pz \end{bmatrix}$$

A calculation of the roll angle will use the following definitions:

$$20d. \; \alpha_1 = \begin{bmatrix} a_2 & a_3 \\ a_3 & -a_2 \\ a_2 & a_3 \\ a_3 & -a_2 \end{bmatrix}$$

is the accelerometer coefficient matrix.

$$20e. \; \beta_1 = \begin{bmatrix} q_{21} & q_{22} & q_{23} & 0 & 0 & 0 \\ q_{31} & q_{32} & q_{33} & 0 & 0 & 0 \\ 0 & 0 & 0 & q_{21} & q_{22} & q_{23} \\ 0 & 0 & 0 & q_{31} & q_{32} & q_{33} \end{bmatrix}$$

is the pitch/heading coefficient matrix.

$$20f. \; \overline{\omega_1} = \begin{bmatrix} \Delta Vx \\ \Delta Vy \\ \Delta Vz \\ \Delta Px \\ \Delta Py \\ \Delta Pz \end{bmatrix}$$

is the GPS information vector and $$20g. \; \overline{\chi}_1 = \begin{bmatrix} CR \\ SR \end{bmatrix}$$

is the unknown roll quantity. Rewriting Equation 20c provides:

$$\alpha_1 \overline{\chi}_1 = \beta_1 \overline{\omega}_1 \qquad 21.$$

The $\alpha_1$ matrix is a 4×2 matrix. $\overline{\chi}_1$ is a 2×1 vector. Solving Equation 21 for $\overline{\chi}_1$, recognizing that Equation 21 represents four equations in two unknowns (CR, SR), proceeds with multiplying both sides of Equation 21 by $\alpha_1^T$ to provide:

$$\alpha_1^T \alpha_1 \overline{\chi}_1 = \alpha_1^T \beta_1 \overline{\omega}_1 \qquad 22a.$$

Pre-multiplying both sides by the inverse of the product of the $\alpha_1^T \alpha_1$ provides:

$$\overline{\chi}_1 = [\alpha_1^T \alpha_1]^{-1} \alpha_1^T \beta_1 \overline{\omega}_1 \qquad 22b.$$

Therefore, since $$23a. \; \overline{\chi}_1 = \begin{bmatrix} CR \\ SR \end{bmatrix} = \begin{bmatrix} \chi_1(1) \\ \chi_1(2) \end{bmatrix}$$

the roll angle is:

$$\text{Roll } (\phi) = \tan^{-1}(\chi_1(2)/\chi_1(1)) = \tan^{-1}(SR/CR) \qquad 23b.$$

This procedure is followed for additional sample times by again solving the over-determined system as follows. For $t=t_2$ there will be eight equations with two unknowns (cos R, sin R) and for $t=t_n$ there will be 4n equations with two unknowns (cos R, sin R).

The iterative solution is found by stacking the equations as follows (i.e., for $t=t_2$):

$$24. \begin{bmatrix} \alpha_1 \\ \alpha_2 \end{bmatrix} \overline{\chi}_2 = \begin{bmatrix} \beta_1 \overline{\omega}_1 \\ \beta_2 \overline{\omega}_2 \end{bmatrix}$$

where $\alpha_1$, $\beta_1$ and $\overline{\omega}_1$ have been defined above. The new variables $\alpha_2$, $\beta_2$ and $\overline{\omega}_2$ have the same structure as $\alpha_1$, $\beta_1$ and $\overline{\omega}_1$ except that they represent the values at $t=t_2$. Also, $\overline{\chi}_2$ represents the values of cos R, sin R utilizing the variable over two data samples. The solution at $t=t_2$ is therefore obtained as before and as follows:

$$25. \; [\alpha_1^T \; \alpha_2^T] \begin{bmatrix} \alpha_1 \\ \alpha_2 \end{bmatrix} \overline{\chi}_2 = [\alpha_1^T \; \alpha_2^T] \begin{bmatrix} \beta_1 \overline{\omega}_1 \\ \beta_2 \overline{\omega}_2 \end{bmatrix}$$

$$26. \; \overline{\chi}_2 = \left[ \sum_{i=1}^{2} (\alpha_i^T \alpha_i) \right]^{-1} \left[ \sum_{i=1}^{2} \alpha_i^T \beta_i \overline{\omega}_i \right]$$

Similarly at $t=t_n$, for n data samples, $$27. \; \overline{\chi}_n = \left[ \sum_{i=1}^{n} (\alpha_i^T \alpha_i) \right]^{-1} \left[ \sum_{i=1}^{n} \alpha_i^T \beta_i \overline{\omega}_i \right]$$

$$28. \; \text{Roll}_n = \tan^{-1}\left( \frac{\chi_n(2)}{\chi_n(1)} \right)$$

For a generalize d projectile or vehicle we also need data for the pitch and heading coefficient matrix. The heading and pitch (no gyro) might be approximated from the ground track (arctan Vn/Ve), and the pitch from the flight path angle (arctan of the vertical velocity or rate of change of altitude and the ground speed as determined from delta P North and delta P east). A rough heading may be available from a magnetic compass or a solid state magnetic compass available from Honeywell. If the winds aloft are known, they might be used to correct the heading and if the angle of attack were known, it might be used to correct the pitch angle.

Figure 5:
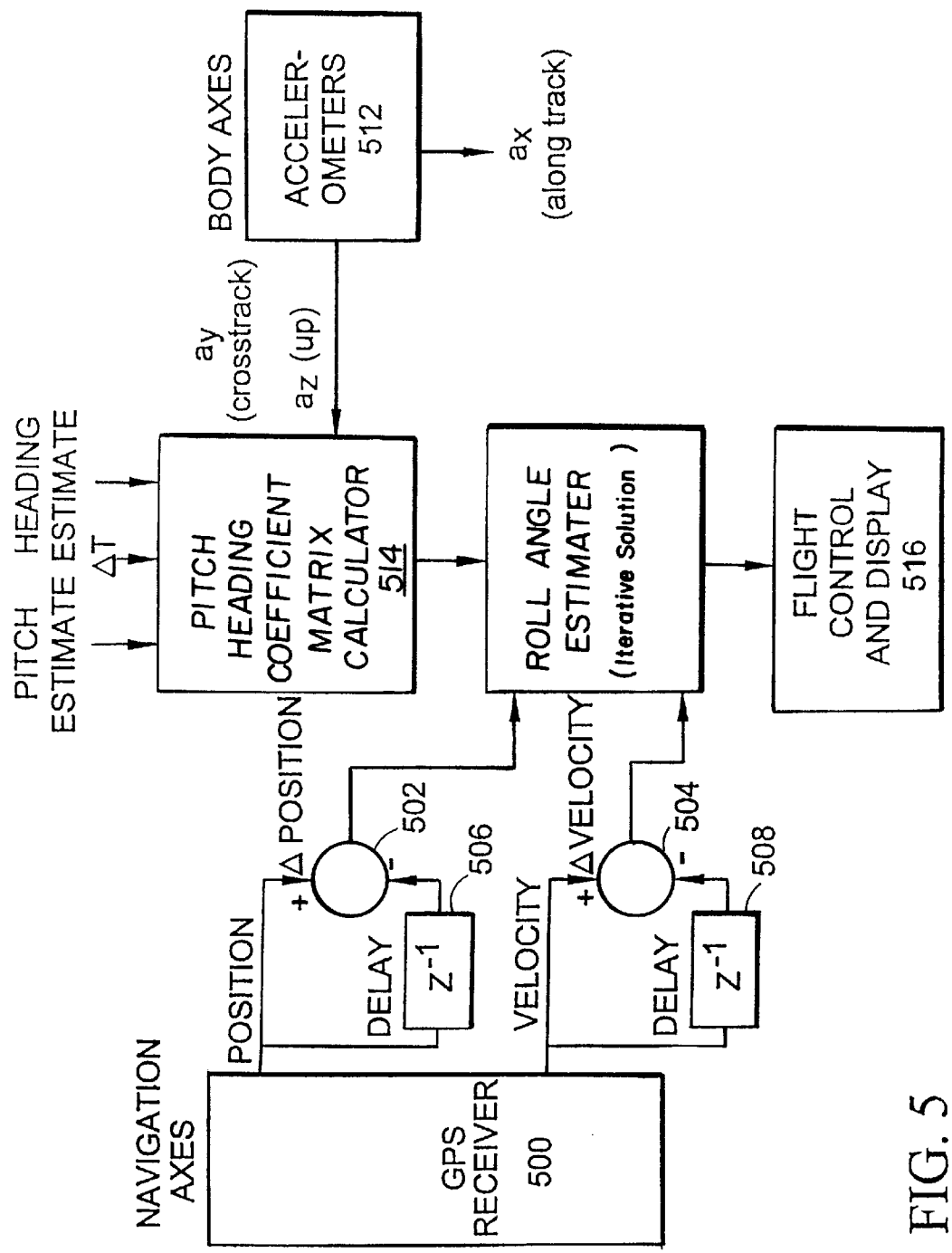
FIG. 5 is a block diagram for the functional steps in a Roll Angle Computation.

FIG. 5 is a block diagram that schematically provides an overview of the process functions necessary for roll angle computation. GPS RECEIVER, block 500 is shown with its internal computer providing POSITION and VELOCITY data via POSITION sampler 502, and VELOCITY SAMPLER 504. Each sampler has a respective sampler delay 506 and 508. The outputs of the samplers are Δ POSITION and Δ VELOCITY and this data is coupled to a ROLL ESTIMATE (Iterative Solution) functional block 510. The ACCELEROMETERS block 512 represents the triax of accelerometers aligned with the BODY AXES described earlier. The component of acceleration $a_x$ is aligned with the longitudinal axis of the projectile as shown in FIG. 1. The component of acceleration $a_x$ changes very slowly during the flight from one second to the next. The component of acceleration $a_y$ is the cross track acceleration and the $a_z$ is the component of acceleration along the up axis both being shown in FIG. 1. The PITCH HEADING COEFFICIENT MATRIX 514 is initialized with $a_y$ and $a_z$ accelerometer data. Processing of the data uses present PITCH ESTIMATE and HEADING ESTIMATE for trigonometric values. The input ΔT will be shown to have the preferred value of one second. The PITCH HEADING COEFFICIENT MATRIX is used with the GPS Δ POSITION and Δ VELOCITY inputs by the ROLL ESTIMATE functional block 510 to provide a roll angle φ output to the FLIGHT CONTROL block 516 which includes block 26 in FIG. 1.

Smoothing

The smoothing process referred to by block 344 in FIG. 3a will now be explained in connection with a discussion of FIGS. 6, 7a and 7b. The invention projectile guidance system with accelerometers and a GPS receiver outputs a smoothed estimate of the past trajectory of the projectile from launch to its present position, throughout its flight, to the FLIGHT CONTROL block 26, shown on FIGS. 1 and 5, along with the attitude angles to permit the flight control function 26 to adjust the heading or ground track of the projectile to the known target location.

Figure 6:
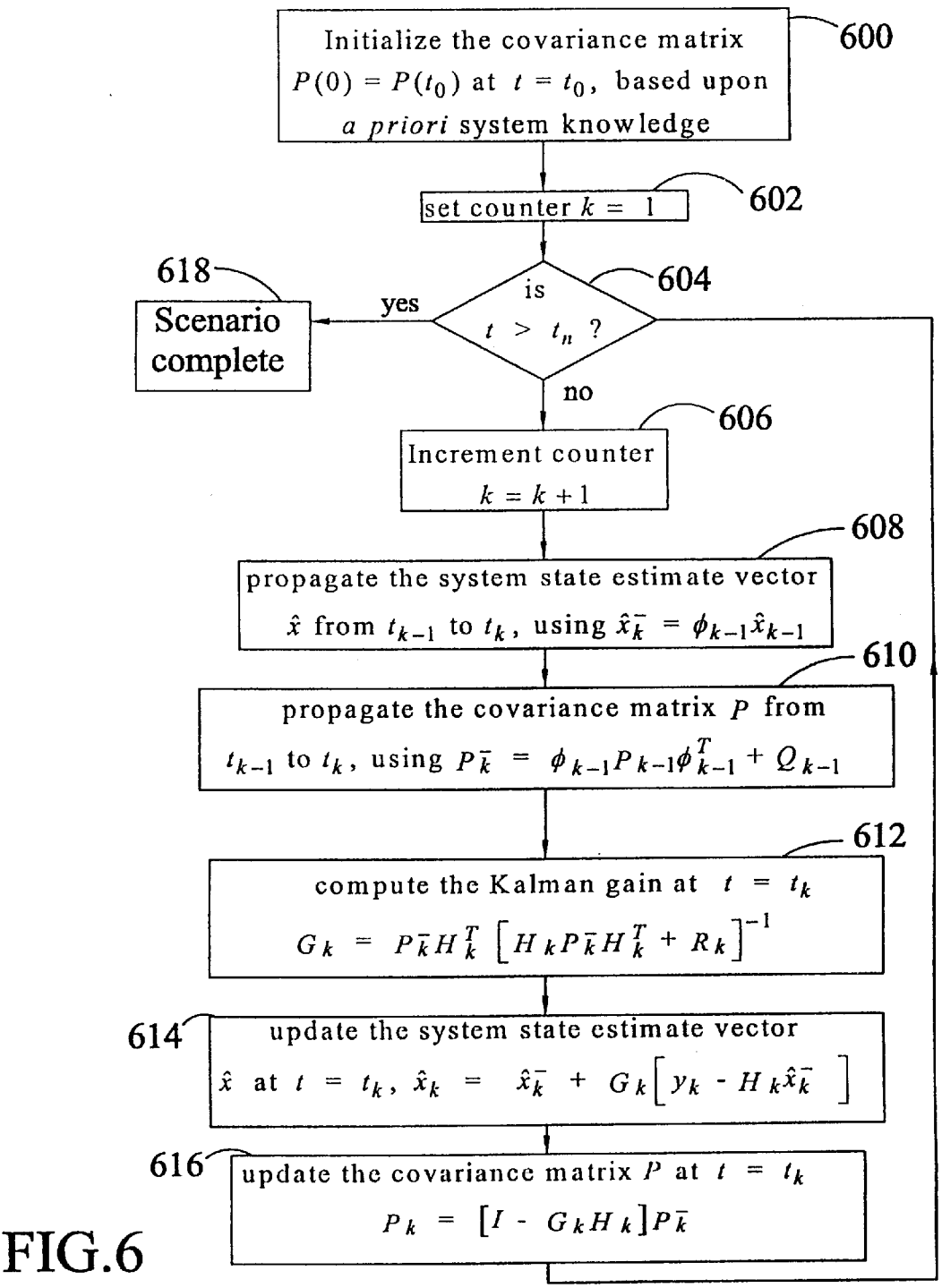
FIG. 6 is a flow chart for the steps in a typical Kalman filter and for calculating an alternate roll angle.

FIG. 6 provides an embodiment of a forward smoother. The embodiment shown uses Kalman filter. The Kalman filter of block 364, on FIGS. 3b is such a filter in which there have been n measurements $\{y_1, y_2, y_2, \ldots, y_n\}$ at times $t_1, t_2, \ldots, t_n$.

A measurement at time $t_k$ might contain acceleration data from an instrument or a velocity or a piece of position data or a sample of velocity or position data from a GPS input or from accelerometer data as delta V data and these values are arrayed as values of the y vector as $\{y_1, y_2, y_2, \ldots, y_n\}$. We want an estimate of the system state at each update.

The process is time indexed or sample indexed with GPS information at a one Hz sample rate. Between GPS samples, the system reprocesses all past samples and states using the measurement index counter or k counter to provide an index as it counts from 1 to n.

The process has the objective of going back in time to obtain an educated estimate of the system state vector at an earlier sample time $t_k$. Measurement data, such as GPS position data, is indexed as it is acquired or received as samples 1 through k with the last sample received being measurements indexed as sample n.

FIG. 6 starts at block 600 with the initialization of the covariance matrix $P(0)=P(t_0)$ at $t=t_0$ based on a knowledge of the initial state of the process at startup. Block 602 shows that the sample index counter, the k counter, is then set to one and block 604 tests to see if time t is greater than $t_n$. If time is less than or equal to $t_n$, the test advances to block 606 and increments the index counter by one.

Block 608 represents the step of propagating the system state vector or estimated state vector $\hat{x}$ from time $t_{k-1}$ to time $t_k$. The symbol $\phi_{k-1}$ represents the system equation or transfer function. The transfer function $\phi_{k-1}$ propagates the state vector of the system $\hat{x}$ from time k−1 to time k. The state vector expressed as a state matrix "x" is a column matrix that is "m" by one in dimension. The covariance matrix P is "m" by "m" in dimension.

The processes advances to block 610. In this step, the flow chart propagates the covariance matrix P from $t_{k-1}$ to $t_k$, using the equation $$P_k = \phi_{k-1} P_{k-1} \phi_{k-1}^T + Q_{k-1}.$$

In this equation, the term $P_k$ is the error covariance associated with the filter estimate of the state vector $\hat{x}_k^-$. The transfer function $\phi_{k-1}$ and its transpose $\phi_{k-1}^T$ are introduced above. The term $Q_{k-1}$ is the covariance matrix of the process noise.

In block 612, the process computes the Kalman filter gain for time $t=t_k$. The symbol $G_k$ represents the Kalman gain. The term $H_k$ is the measurement or observation matrix at time $t=t_k$, and $H_k^T$ represents the transpose of the measurement matrix at time $t=t_k$. The measurement matrix will typically be formed from elements such as Vx, Vy. The y vector or measurement vector is formed from the product of the H matrix and the state vector x the product being added to the measurement noise matrix.

Within the brackets of the expression in block 612, the error covariance matrix $P_k^-$ is multiplied by the transpose of the measurement matrix $H_k^T$. The product of the two is then multiplied by the measurement matrix $H_k$. The result of the product is added to $R_k$, the covariance matrix of the measurement noise vector.

The $R_k$ matrix is obtained from information that is gathered by the systems engineers through empirical testing. The systems engineers determine what noise is associated with each sensor by collecting historical noise data on each measurement variable. The $H_k$ matrix is given and is hardware and instrument dependent. The Kalman gain is determined and then used to update the estimate of the state vectors in block 614. As each measurement is taken, it is itself a function of a combination of the states. For example, the velocity of a projectile might be the result of x and y velocity components. The result is a linear combination of the individual measurements.

The process advances to block 614 and the system state estimate vector is updated for time $t_k$ using the equation: $\hat{x}_k = \hat{x}_k^- + G_k[y_k - H_k \hat{x}_k^-]$. The term $H_k$ multiplies the term $\hat{x}_k^-$. The result is subtracted from $y_k$. The result is an observable difference that is multiplied by the Kalman gain and then added to the previously estimated state vector $\hat{x}_k^-$.

The minus sign in the superscript of $\hat{x}_k^-$ implies that it represents the state a little before the kth update. The sample index "k" can range in value from 1 to n where n is the most recent update index in time. A state variable without a superscript implies that the state variable value is a value that exists just after an update. The symbol $\hat{x}_k$ represents the kth estimate of the state vector x. When the $y_k$ measurement is made, the kth update is performed for the $y_k$ measurement. The measurement index "k" is a running index.

After updating the state vector at time $t=t_k$ by evaluating the equation in block 614, the process proceeds to the equation in block 616:

$$P_k = [I - G_k H_k] P_k,$$

which is used to update the covariance matrix $P_k$. The matrix I is an identity matrix. All of its elements are zero except the main diagonal elements which are ones. The dimension of the identity matrix is matched to the product of $G_k$ and $H_k$ matrices. All of the values necessary for the computation of the covariance matrix are available from previous steps.

After the computation of the $P_k$ matrix, the process leaves block 616 and transfers back to decision block 604 to once again test to see if $t > t_n$. As time reaches $t_n$ all of the measurements have been processed. No additional measurements are to be made. A "yes" result transfers the process to the Scenario Complete block 618 and the mission is completed. If the flight had lasted one hundred seconds and the GPS provided position measurements at one per second, there would have been 100 GPS samples and the sample index k would have been incremented from 1 to 100. The index "k" can not exceed 100.

Figure 7A:
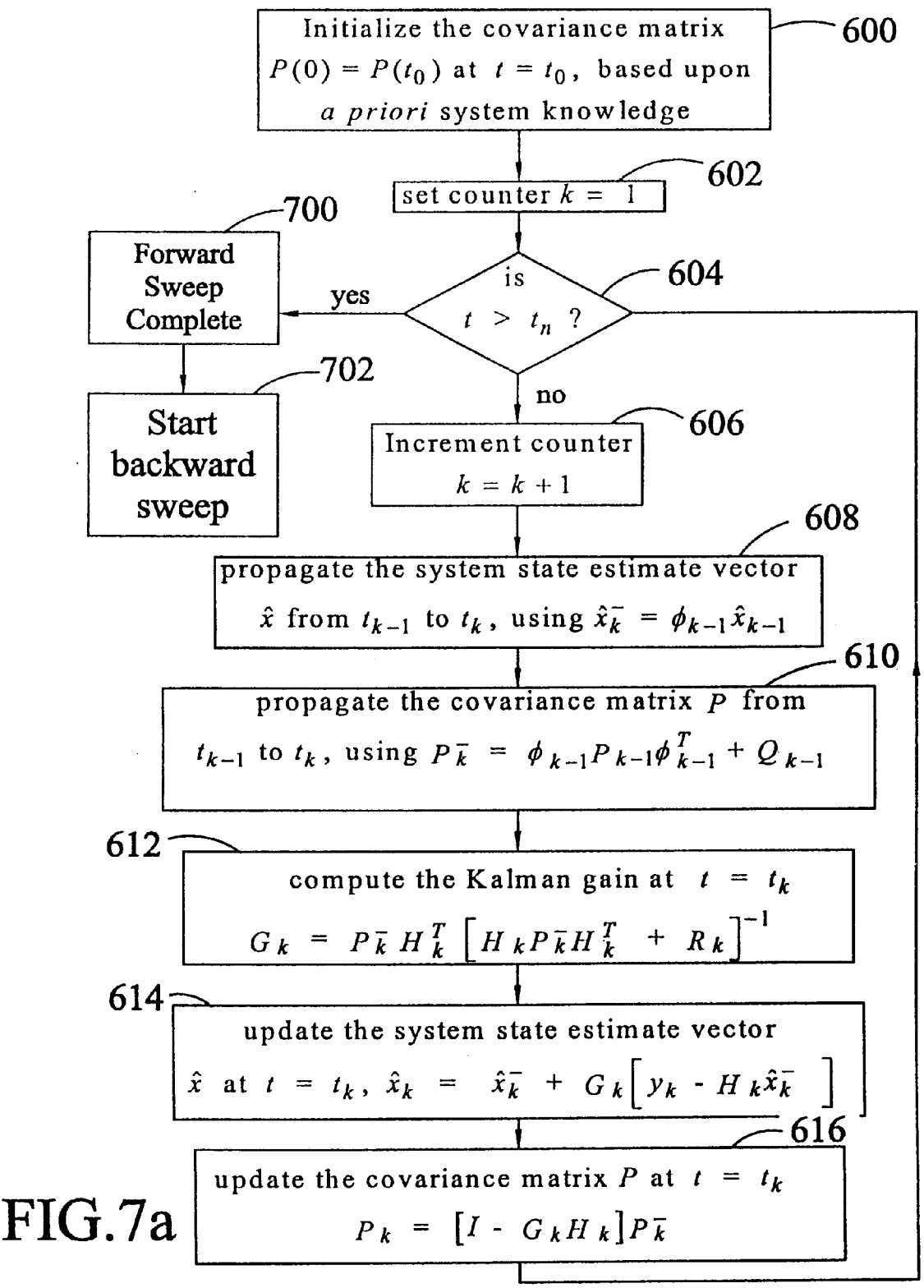
FIG. 7a is a flow chart of the forward filter steps in a typical Smoother.
Figure 7B:
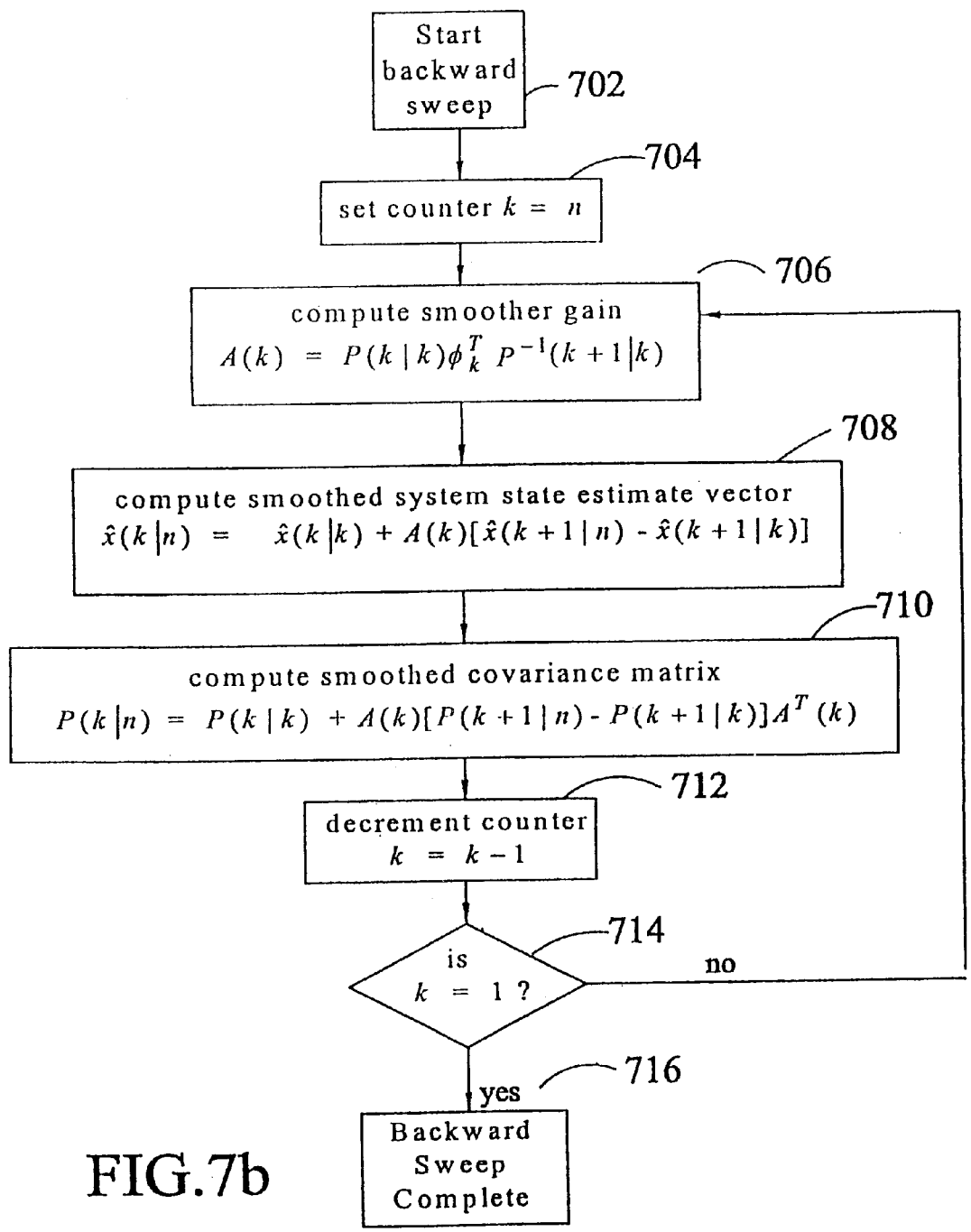
FIG. 7b is a flow chart of the backward filter steps in a typical smoother.

FIGS. 7a and 7b form a fixed interval smoother, FIG. 7a providing a forward pass and FIG. 7b providing a backward pass. FIG. 7a can be seen to be identical in function to that of FIG. 6 with the exception of blocks 700. The process exits block and advances to block 702 also found at the top of FIG. 7b. The backward sweep begins with block 704 as the process sets the sample index counter, i.e., the k counter to current index value of n. The object of the backward sweep process of FIG. 7b is to compute the smoother estimate $x_s(k) = \hat{x}(k|n)$ and the smoother error covariance $P_s(k) = P(k|n)$, using all n measurements as the measurement index counter "k" is decremented k=n, n−1, n−2, . . . , 1. A subscript "s" in the expression $x_s(k)$ and in the expression $P_s(k)$ indicates a smoothed variable.

The process advances to block 706 to compute smoother gain:

$$A(k) = P(k|k) \phi_k^T P^{-1}(k+1|k)$$

The vertical bar followed by a "k" in a term such as (k|k) means that the matrix will be evaluated for all measurements up to and including the kth measurement. The backward sweep begins only after the conclusion of a forward sweep. All k measurements are available at the conclusion of the forward sweep. All k data points form a fixed interval, and all n measurements from $t_k$ back to $t_1$ are used during the backward sweep.

The covariance matrix P(k|k) is multiplied with the transpose of the transfer function $\phi_k$ at time t=k.

The rightmost term in block 706 is the inverse of the covariance matrix P(k+1|k) at time $t_{k+1}$, using all k measurements. The vertical bar followed by "k" shows that all of the data for measurements through k is to be used.

The process then advances to block 708. The object of the equation in block 708 is to compute a smoothed state vector $\hat{x}(k|n)$ using all n measurements. The equation in block 708 is:

$$\hat{x}(k|n) = \hat{x}(k|k) + A(k)[\hat{x}(k+1|n) - \hat{x}(k+1|k)]$$

The gain matrix A(k) is available from block 706. The first term after the equal sign is the kth state vector estimate using measurement data through measurement k. The first term inside of the bracket, the term $\hat{x}(k+1|n)$ represents the estimate of the state vector at time k+1 using data for all measurements through measurement n. The second term inside of the bracket $\hat{x}(k+1|k)$ is an estimate of the state vector at time k+1 using all measurements up to time $t_k$. The difference is calculated as the second term is subtracted from the first. The result is multiplied by the gain matrix, the product is added to $\hat{x}(k|k)$.

The process then advances to block 710 to compute a smoothed covariance matrix from the equation:

$$P(k|n) = P(k|k) + A(k)[P(k+1|n) - P(k+1|k)]A^T(k)$$

The first covariance term after the equal sign P(k|k) uses all data through the kth update. The first covariance term in the bracket P(k+1|n) uses all of the data from measurements through measurement n. The second covariance term in the bracket P(k+1|k) uses only data up though the kth update. A covariance difference is calculated from the covariance terms within the brackets. The covariance difference term is then multiplied by the gain matrix and the result is added to P(k|k).

After the smoothed covariance estimate is calculated, the process advances to block 712 and decrements the measurement index counter from k to k−1. The process then advances to decision block 714 and a test is made to determine if the measurement index matrix k is greater than one. Looping or cycling continues with each "no" decision followed by a cycle back to block 706 until k=1. When k=1, the test at block 714 results in a "yes" decision and the process advances to block 716, the Backward Sweep Complete block. Block 716 signals the conclusion of the program as the projectile nears its target.

Those skilled in the art will appreciate that various adaptations and modifications of the preferred embodiments can be configured without departing from the scope and spirit of the invention. Therefore, it is to be understood that the invention may be practiced other than as specifically described herein, within the scope of the appended claims.

What is claimed is:

1. A projectile guidance system with accelerometers and a GPS receiver comprising:
    a projectile having
        a triax of accelerometers mounted in the projectile and providing roll, pitch and azimuth axis acceleration data,
        a GPS antenna and receiver means mounted in the projectile for providing and updating present position data,
        a computer and memory mounted in the projectile and executing a guidance program, the guidance program being responsive to the roll, pitch and azimuth axis acceleration data and to the sampled present position data for calculating and outputing time indexed roll, pitch and azimuth angles, time indexed present position and velocity to a flight control system for guiding the projectile to a predetermined target location.

2. The projectile guidance system of claim 1 wherein the guidance program is further characterized to calculate an estimated projectile trajectory based on data including the launch site present position, initial pitch angle, azimuth angle and the target destination.

3. The projectile guidance system of claim 1 wherein the guidance program is further characterized to calculate an estimated projectile trajectory based on data including the launch site present position, initial pitch azimuth angle, the target destination and data from a turns counter.

4. The projectile guidance system of claim 1 wherein the guidance program is further characterized to calculate an estimated projectile trajectory based on data including the launch site present position, initial pitch angle, azimuth angle, the target destination, data from a turns counter, and a forward sweep recursive filter responsive to previously stored time indexed data for calculating and smoothing an estimated projectile trajectory, and outputting the smoothed time indexed trajectory data to the flight control system for use in guiding the projectile to the predetermined target location after each present position data update.

5. The projectile guidance system of claim 1 wherein the guidance program is further characterized to calculate an estimated projectile trajectory based on data including the launch site present position, initial pitch angle, and azimuth angle, the target destination, data from a turns counter, a forward sweep recursive filter and a backward sweep recursive filter, each respective filter being responsive to previously stored time indexed data for calculating and smoothing an estimated projectile trajectory and outputting the smoothed time indexed trajectory data to the flight control system for use in guiding the projectile to the predetermined target location.

6. The projectile guidance system of claim 1 wherein the guidance program is further characterized to calculate an estimated projectile trajectory based on data including the launch site present position, initial pitch angle, azimuth angle, the target destination, data from a turns counter, a forward Kalman sweep recursive filter and a backward sweep recursive filter, each respective filter being responsive to previously stored time indexed data for calculating and outputting a smoothed estimated projectile trajectory, and iterating the data comprising the smoothed time indexed trajectory data and outputting the smoothed time indexed trajectory data to the flight control system for use in guiding the projectile to the target location.

7. A projectile guidance system without gyros comprising:
  a projectile or vehicle in flight after launch, the projectile having an orthogonal body coordinate system with
    a longitudinal or x-axis for roll measurement,
    a y-axis for pitch measurement, and a
    a z-axis for yaw measurement,
  the projectile having at least a triax of accelerometers comprising an x accelerometer for providing x-axis acceleration data measured along the x-axis, a y-accelerometer for providing y-axis acceleration data measured along the y-axis and a z-accelerometer for providing z-axis acceleration data measured along the z-axis,
  a GPS antenna and receiver means for providing onboard GPS position and GPS velocity data in earth referenced navigational coordinates,
  a computer and memory and program means for storing and accessing time indexed GPS position and GPS velocity data and for transforming
  the x, y and z axis acceleration data from body to navigation coordinates, the acceleration data being arrayed and having time indexes common with the GPS position and velocity data,
  the program means being responsive to corresponding time indexed acceleration data and to GPS velocity and position data for calculating and outputting an estimated projectile roll, pitch and yaw angle with respect to local level for each time index iteration of present position, velocity and acceleration data to a flight control system for guiding the projectile to a predetermined target location.

8. The projectile guidance system of claim 7 wherein the guidance program is further characterized to calculate an estimated projectile trajectory based on data including the launch site present position, initial pitch, azimuth angle and the target destination and data from a turns counter.

9. The projectile guidance system of claim 7 wherein the guidance program is further characterized to calculate an estimated projectile trajectory based on data including the launch site present position, initial pitch angle, azimuth angle, the target destination, data from a turns counter and a forward sweep recursive filter responsive to previously stored time indexed data for calculating and smoothing an estimated projectile trajectory and outputting the smoothed time indexed trajectory data to the flight control system for use in guiding the projectile to the predetermined target location.

10. The projectile guidance system of claim 7 wherein the guidance program is further characterized to calculate an estimated projectile trajectory based on data including the launch site present position, initial pitch angle, azimuth angle, the target destination, data from a turns counter, a forward sweep recursive filter and a backward sweep recursive filter, each respective filter being responsive to previously stored time indexed data for calculating and smoothing an estimated projectile trajectory and outputting the smoothed time indexed trajectory data to the flight control system for use in guiding the projectile to the predetermined target location.

11. The projectile guidance system of claim 7 wherein the guidance program is further characterized to calculate an estimated projectile trajectory based on data including the launch site present position, initial pitch angle, azimuth angle, the target destination, data from a turns counter, a forward Kalman sweep recursive filter and a backward sweep recursive filter, each respective filter being responsive to previously stored time indexed data for calculating and outputting a smoothed estimated projectile trajectory, and iterating the data comprising the smoothed time indexed trajectory data and outputting the smoothed time indexed trajectory data to the flight control system for use in guiding the projectile to the predetermined target location.

12. A projectile guidance system process for the guidance of a vehicle or projectile without gyros, the vehicle having been launched and having an orthogonal coordinate system with a longitudinal or x-axis for roll measurement, a y-axis for pitch measurement, and a z-axis for yaw measurement, a triax of accelerometers outputting x, y and z axis acceleration, and a GPS antenna and receiver means for providing GPS position and GPS velocity data in earth referenced navigational coordinates, the projectile guidance system process comprising the steps of:
  receiving, indexing and storing GPS position and velocity data with concurrent x, y and z axis acceleration data with a computer and memory means executing a program to calculate a trajectory for the vehicle as a function of a set of state equations, the program
  converting the x, y and z axis acceleration data to a local level navigational reference system, the program then
  solving a set of time indexed state equations to update the system's estimated state, and then
  computing a time indexed pitch, roll and yaw angle in locally level coordinates, the program then
  outputting the time indexed pitch, roll yaw angle in locally level coordinates with a corresponding time indexed present position to a flight control system for guiding the projectile to a destination.

13. The projectile guidance system process of claim 12 wherein before the step of receiving, indexing and storing GPS position and velocity data with concurrent x, y and z axis acceleration data performing the step of:

estimating and providing a set of initial conditions for insertion into a set of state equations;

calculating a trajectory for the vehicle as a function of the set of state equations, and the estimated initial conditions.

14. The projectile guidance system process of claim 12 wherein after the step of outputting the time indexed pitch, roll yaw angle in locally level coordinates with a corresponding time indexed present position, performing the step of:

calculating an estimated projectile trajectory based on data including the launch site present position, initial pitch angle, azimuth angle and the target destination.

15. The projectile guidance system of claim 12 wherein after the step of outputting the time indexed pitch, roll yaw angle in locally level coordinates with a corresponding time indexed present position, performing the step of:

calculating an estimated projectile trajectory based on data including the launch site present position, initial pitch angle, azimuth angle and the target destination and data from a turns counter.

16. The projectile guidance system of claim 12 wherein after the step of outputting the time indexed pitch, roll yaw angle in locally level coordinates with a corresponding time indexed present position, performing the step of:

calculating an estimated projectile trajectory based on data including the launch site present position, initial pitch angle, azimuth angle and the target destination and data from a turns counter, and using a forward sweep recursive filter responsive to previously stored time indexed data for calculating and smoothing an estimated projectile trajectory and outputing the smoothed time indexed trajectory data to the flight control system for use in guiding the projectile to the predetermined target location.

17. The projectile guidance system of claim 12 wherein after the step of outputting the time indexed pitch, roll yaw angle in locally level coordinates with a corresponding time indexed present position, performing the step of:

calculating an estimated projectile trajectory based on data including the launch site present position, initial pitch angle, azimuth angle and the target destination and data from a turns counter, and using a forward sweep recursive filter and a backward sweep recursive filter, projectile guidance system without gyros comprising:

a projectile or vehicle in flight after launch, the projectile having an orthogonal body coordinate system with a longitudinal or x-axis for roll measurement, a y-axis for pitch measurement, and a a z-axis for yaw measurement, the projectile having at least a triax of accelerometers comprising an x accelerometer for providing x-axis acceleration data measured along the x-axis, a y-accelerometer for providing y-axis acceleration data measured along the y-axis and a z-accelerometer for providing z-axis acceleration data measured along the z-axis, a GPS antenna and receiver means for providing onboard GPS position and GPS velocity data in earth referenced navigational coordinates, a computer and memory and program means for storing and accessing time indexed GPS position and GPS velocity data and for transforming the x, y and z axis acceleration data from body to navigation coordinates, the acceleration data being arrayed and having time indexes common with the GPS position and velocity data, the program means being responsive to corresponding time indexed acceleration data and to GPS velocity and position data for calculating and outputting an estimated projectile roll, pitch and yaw angle with respect to local level for each time index iteration of present position, velocity and acceleration data to a flight control system for guiding the projectile to a predetermined target location each respective filter being responsive to previously stored time indexed data for calculating and smoothing an estimated projectile trajectory and outputting the smoothed time indexed trajectory data to the flight control system for use in guiding the projectile to the predetermined target location.

18. A projectile guidance system without gyros comprising:

a projectile or vehicle in flight after launch, the projectile having an orthogonal body coordinate system with a longitudinal or x-axis for roll measurement, a y-axis for pitch measurement, and a a z-axis for yaw measurement, the projectile having at least a triax of accelerometers comprising an x accelerometer for providing x-axis acceleration data measured along the x-axis, a y-accelerometer for providing y-axis acceleration data measured along the y-axis and a z-accelerometer for providing z-axis acceleration data measured along the z-axis, a GPS antenna and receiver means for providing onboard GPS position and GPS velocity data in earth referenced navigational coordinates, a computer and memory and program means for storing and accessing time indexed GPS position and GPS velocity data and for transforming the x, y and z axis acceleration data from body to navigation coordinates, the acceleration data being arrayed and having time indexes common with the GPS position and velocity data, the program means being responsive to corresponding time indexed acceleration data and to GPS velocity and position data for calculating and outputting an estimated projectile roll, pitch and yaw angle with respect to local level for each time index iteration of present position, velocity and acceleration data to a flight control system for guiding the projectile to a predetermined target location.

* * * * *